(12) United States Patent
Haga

(10) Patent No.: US 9,759,136 B2
(45) Date of Patent: Sep. 12, 2017

(54) VARIABLE VALVE OPERATING SYSTEM

(71) Applicant: TOYOTA JIDOSHA KABUSHIKI KAISHA, Toyota-shi, Aichi-ken (JP)

(72) Inventor: Hiroyuki Haga, Numazu (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 54 days.

(21) Appl. No.: 15/014,525

(22) Filed: Feb. 3, 2016

(65) Prior Publication Data

US 2016/0230679 A1 Aug. 11, 2016

(30) Foreign Application Priority Data

Feb. 6, 2015 (JP) ................................. 2015-022240

(51) Int. Cl.
| | |
|---|---|
| *F01L 1/34* | (2006.01) |
| *F02D 13/02* | (2006.01) |
| *F01L 13/00* | (2006.01) |
| *F02D 41/12* | (2006.01) |
| *F01L 1/18* | (2006.01) |

(Continued)

(52) U.S. Cl.
CPC .......... *F02D 13/0207* (2013.01); *F01L 1/185* (2013.01); *F01L 1/267* (2013.01); *F01L 13/0036* (2013.01); *F02D 41/0005* (2013.01); *F02D 41/123* (2013.01); *F01L 1/2411* (2013.01); *F01L 2001/186* (2013.01); *F01L 2001/467* (2013.01); *F01L 2105/00* (2013.01); *F01L 2800/00* (2013.01); *F02D 2041/001* (2013.01); *Y02T 10/18* (2013.01); *Y02T 10/42* (2013.01)

(58) Field of Classification Search
CPC ..... F01L 1/185; F01L 1/267; F01L 2001/186; F02D 13/0207; F02D 41/0005; F02D 41/123
USPC ................................ 123/90.16, 90.39, 90.44
See application file for complete search history.

(56) References Cited

U.S. PATENT DOCUMENTS

| | | | |
|---|---|---|---|
| 7,793,625 B2 * | 9/2010 | Nakamura | ............ F01L 1/3442 123/346 |
| 2010/0224150 A1 | 9/2010 | Ezaki | |
| 2016/0053736 A1 | 2/2016 | Matsufuji et al. | |

FOREIGN PATENT DOCUMENTS

| | | |
|---|---|---|
| JP | H02-221618 A | 9/1990 |
| JP | 2005-042608 A | 2/2005 |

(Continued)

*Primary Examiner* — Ching Chang
(74) *Attorney, Agent, or Firm* — Andrews Kurth Kenyon LLP

(57) ABSTRACT

A variable valve operating system assembled in an engine includes a first rocker arm contacting with a valve, a second rocker arm no contacting with any valve, a lost motion spring bringing the second rocker arm into contact with a cam, and switching device for switching the first/second rocker arms to a coupled or uncoupled state. An operation control apparatus for the engine includes element for determining whether or not an engine speed is higher than a first speed at which supply of fuel is allowed to be temporarily stopped, and element for setting a requested quantity of increase/decrease in internal resistance of the engine. When the engine speed is higher than the first speed and an accelerator opening degree is 0%, the switching device switches the first/second rocker arms to the coupled or uncoupled state based on the requested quantity.

14 Claims, 14 Drawing Sheets

(51) Int. Cl.
*F01L 1/26* (2006.01)
*F02D 41/00* (2006.01)
*F01L 1/46* (2006.01)
*F01L 1/24* (2006.01)

(56) References Cited

FOREIGN PATENT DOCUMENTS

| | | |
|---|---|---|
| JP | 2008-151037 A | 7/2008 |
| JP | 2008-157195 A | 7/2008 |
| JP | 2009-103017 A | 5/2009 |
| JP | 2009-264200 A | 11/2009 |
| JP | 2012-165589 A | 8/2012 |
| JP | 2012-192813 A | 10/2012 |
| JP | 2013-015065 A | 1/2013 |
| JP | 2013-071574 A | 4/2013 |
| JP | 2013-142328 A | 7/2013 |
| JP | 2014-190159 A | 10/2014 |
| JP | 2015-034534 A | 2/2015 |
| WO | 2015/019162 A1 | 2/2015 |

* cited by examiner

VARIABLE VALVE OPERATING SYSTEM

CROSS-REFERENCES TO RELATED APPLICATIONS

This application claims the benefit of Japanese Patent Application No. 2015-022240, filed Feb. 6, 2015, which is hereby incorporated by reference wherein in its entirety.

BACKGROUND OF THE INVENTION

Field of the Invention

The present invention relates to an operation control apparatus for an internal combustion engine in which a variable valve operating system is assembled.

Description of the Related Art

Variable valve operating systems are known which enable a change in the valve timing or lift of an intake valve and/or an exhaust valve in order to optimize, for example, an output property of an internal combustion engine according to an operation state of a vehicle. Some of these variable valve operating systems are well known from Japanese Patent Laid-Open No. 2008-151037, Japanese Patent Laid-Open No. 2009-264200, and the like; in the variable valve operating systems disclosed in these patents, for a single valve, a plurality of cams with different cam profiles and a plurality of rocker arms with which the respective cams are contact with are selectively allowed to function. Advantageously, the variable valve operating systems that allow the plurality of rocker arms to selectively function for the individual valves can be configured at relatively low cost compared to variable valve operating systems based on other schemes.

In such a variable valve operating system, the valve timing and the lift of the intake valve/exhaust valve are changed according to the quantity of fuel supplied to the internal combustion engine mounted in the engine, that is, a fuel injection quantity, and the rotational speed of a crank shaft in the internal combustion engine, that is, an engine speed. In general, the rocker arms to be used are selected such that the intake valve/exhaust valve has a high lift in an operation region with a high engine speed and a large fuel injection quantity, whereas the intake valve/exhaust valve has a low lift in an operation region with a low engine speed and a small fuel injection quantity.

In the variable valve operating systems disclosed in Japanese Patent Laid-Open No. 2008-151037 and Japanese Patent Laid-Open No. 2009-264200 and allowing the plurality of rocker arms to selectively function for the individual valves, spring forces are applied by lost motion springs to the respective rocker arms other than those which are constantly contact with the intake valve/exhaust valve via auto lash adjusters.

In recent years, attempts have been being made to reduce the internal resistance of the internal combustion engine itself in order to increase fuel efficiency. In this regard, the spring forces of the lost motion springs assembled in the variable valve operating system described in Japanese Patent Laid-Open No. 2008-151037 and Japanese Patent Laid-Open No. 2009-264200 may be a factor that increases the internal resistance of the internal combustion engine itself. In particular, a very large value is set for the spring forces of the lost motion springs applied to the rocker arms to temporarily open the exhaust valve in the initial stage of an intake stroke of the internal combustion engine to add a portion of hot exhaust gas to cool intake gas in order to improve ignitability of fuel in a cold state. Thus, the internal resistance of the internal combustion engine is comparatively increased or reduced depending on whether or not the spring forces of the lost motion springs are applied to the intake valve/exhaust valve according to the operation state of the vehicle. For example, when a secondary battery mounted in the vehicle is to be efficiently charged, the internal resistance of the internal combustion engine may be effectively reduced by selecting cams and rocker arms that allow for a reduction in the lift of the intake valve/exhaust valve. When an engine brake is to be more effectively applied during deceleration of the vehicle, the internal resistance of the internal combustion engine may be effectively increased by selecting cams and rocker arms that temporarily open the exhaust valve in the initial stage of the intake stroke of the internal combustion engine.

However, the conventional variable valve operating systems select a combination of cams and rocker arms to be allowed to function only based on the engine speed and the fuel injection quantity. Thus, the conventional variable valve operating systems fail to select a combination of cams and rocker arms allowed to function in accordance with a request for an increase or a reduction in the internal resistance of the internal combustion engine.

SUMMARY OF THE INVENTION

An object of the present invention is to provide an operation control apparatus for an internal combustion engine incorporating a variable valve operating system that enables selection of a combination of cams and rocker arms allowed to function in accordance with a request for an increase or a reduction in the internal resistance of the internal combustion engine.

An operation control apparatus for an internal combustion engine according to the present invention in which a variable valve operating system is assembled, the variable valve operating system includes a first rocker arm with which an intake valve or an exhaust valve is contact and which rocks in conjunction with rotation of a first cam, a second rocker arm with which the intake valve or the exhaust valve is not contact and which rocks in conjunction with rotation of a second cam with a cam profile different from a cam profile of the first cam, a first lost motion spring configured to bias and bring the second rocker arm into contact with the second cam, switching means for switching the first rocker arm and the second rocker arm to a coupled state or an uncoupled state based on a fuel injection quantity supplied to the internal combustion engine and a rotational speed of the internal combustion engine, the operation control apparatus comprises means for determining whether or not a rotational speed of the internal combustion engine is equal to or higher than a preset first rotational speed at which supply of fuel to the internal combustion engine is allowed to be temporarily stopped, an accelerator position sensor, and means for setting a requested quantity of increase or decrease in internal resistance of the internal combustion engine according to a situation of a vehicle, wherein when the rotational speed of the internal combustion engine is equal to or higher than the first rotational speed and an output value of the accelerator position sensor is 0%, the switching means switches the first rocker arm and the second rocker arm to the coupled state or the uncoupled state based on the set requested quantity of increase or decrease in internal resistance.

In the operation control apparatus for the internal combustion engine according to the present invention, the switching means may switch the first rocker arm and the second rocker arm to the uncoupled state when the requested quantity of increase or decrease in internal resistance is equal to or smaller than a first predetermined value, and may switch the first rocker arm and the second rocker arm to the coupled state when the requested quantity of increase or decrease in internal resistance is larger than the first predetermined value. That is, when the first and second rocker arms are set to the uncoupled state, the spring force of the first lost motion spring is prevented from hindering an opening operation of the intake valve or the exhaust valve, avoiding an increase in the internal resistance of the internal combustion engine resulting from the spring force of the first lost motion spring. In contrast, when the first and second rocker arms are set to the coupled state, the spring force of the first lost motion spring acts as the resistance to the opening operation of the intake valve or the exhaust valve, increasing the internal resistance of the internal combustion engine.

In the state of the first rocker arm and the second rocker arm switched by the switching means to the coupled state or the uncoupled state based on the set requested quantity of increase or decrease in internal resistance, when the rotational speed of the internal combustion engine becomes lower than the first rotational speed with the output value of the accelerator position sensor remaining at 0%, the switching means may switch the first rocker arm and the second rocker arm to the coupled state or the uncoupled state based on the rotational speed of the internal combustion engine.

The variable valve operating system may further include a third rocker arm configured to rock in conjunction with rotation of a third cam with which a second intake valve or exhaust valve is contact and which has a cam profile different from the cam profiles of the first and second cams. The switching means may selectively switch the first and second and third rocker arms to the coupled state or the uncoupled state based on the fuel injection quantity supplied to the internal combustion engine and the rotational speed of the internal combustion engine. In this case, the variable valve operating system may further include a second lost motion spring configured to bias and bring the third rocker arm into contact with the third cam. Especially, the first and second lost motion springs may be effective to exert different spring forces. In this case, the switching means may switch all of the first and second and third rocker arms to the uncoupled state when the requested quantity of increase or decrease in internal resistance is equal to or smaller than a first predetermined value. The switching means may also switch the first rocker arm and the rocker arm to which the spring force of the lost motion spring with the higher spring force is applied, to the coupled state, when the requested quantity of increase or decrease in internal resistance is equal to or larger than a second predetermined value larger than the first predetermined value. Furthermore, the switching means may switch the first rocker arm and the rocker arm to which the spring force of the lost motion spring with the lower spring force is applied, to the coupled state, when the requested quantity of increase or decrease in internal resistance is larger than the first predetermined value and smaller than the second predetermined value.

When the rotational speed of the internal combustion engine becomes lower than the first rotational speed with the output value of the accelerator position sensor remaining at 0% in the state of the first and second and third rocker arms selectively switched by the switching means to the coupled state or the uncoupled state based on the set requested quantity of increase or decrease in internal resistance, the switching means may selectively switch the first and second and third rocker arms to the coupled state or the uncoupled state based on the rotational speed of the internal combustion engine. Then, when the rotational speed of the internal combustion engine is lower than a preset second rotational speed lower than the first rotational speed, supply of fuel to the internal combustion engine is restarted regardless of whether or not the switching means is actuated.

When the operation control apparatus is used in a vehicle equipped with the internal combustion engine and a secondary battery charged using the internal combustion engine, the means for setting the requested quantity of increase or decrease in internal resistance may include means for acquiring a charge state of the battery, means for acquiring a deceleration of the vehicle, or means for acquiring a vehicle speed.

The operation control apparatus for the internal combustion engine according to the present invention selects a combination of cams and rocker arms allowed to function based on the requested quantity of increase or decrease in the internal resistance of the internal combustion engine. Thus, the variable valve operating system can be effectively utilized even when the supply of fuel to the internal combustion engine is temporarily stopped.

When the requested quantity of increase or decrease in internal resistance is equal to or smaller than the first predetermined value, the first and second rocker arms are switched to the uncoupled state to allow inhibition of an increase in the internal resistance of the internal combustion engine resulting from the spring force of the first lost motion spring. In contrast, when the requested quantity of increase or decrease in internal resistance is equal to or larger than the second predetermined value larger than the first predetermined value, the first and second rocker arms are switched to the coupled state to allow for an increase in the internal resistance of the internal combustion engine resulting from the spring force of the first lost motion spring.

When the rotational speed of internal combustion engine is lower than the first rotational speed with the output value of the accelerator position sensor remaining at 0%, the first rocker arm and the second rocker arm can be switched to the coupled state or the uncoupled state based on the rotational speed of the internal combustion engine.

When the first and second lost motion springs exert different spring forces, a combination of cams and rocker arms can be selected which is more optimum for the requested quantity of increase or decrease in the internal resistance of the internal combustion engine.

When the rotational speed of internal combustion engine is lower than the first rotational speed with the output value of the accelerator position sensor remaining at 0%, the first, second, and third rocker arms can be selectively switched to the coupled state or the uncoupled state based on the rotational speed of the internal combustion engine. In this case, when the rotational speed of the internal combustion engine is lower than the preset second rotational speed, the supply of fuel to the internal combustion engine is immediately restarted to enable a possible stall of the internal combustion engine to be reliably prevented.

When the means for setting the requested quantity of increase or decrease in internal resistance includes the means for acquiring the charge state of the secondary battery charged using the internal combustion engine, the battery can be charged in a more desirable manner by slightly changing an output from an alternator.

When the means for setting the requested quantity of increase or decrease in internal resistance includes the means for acquiring a deceleration of the vehicle or the means for acquiring a vehicle speed, fuel efficiency can be increased with an engine brake effectively applied in a more preferable manner.

Further features of the present invention will become apparent from the following description of exemplary embodiments with reference to the attached drawings.

DESCRIPTION OF THE EMBODIMENTS

An embodiment in which the present invention is applied to a vehicle having a compression ignition type multi-cylinder internal combustion engine mounted thereon will be explained in detail with reference to FIGS. 1 to 14. The present invention is not, however, limited to this embodiment, and its configuration can be changed freely according to the characteristics required. The present invention is effectively applied to a spark ignition type internal combustion engine in which gasoline, alcohol, LNG (Liquefied Natural Gas), or the like is used as fuel to be ignited by an ignition plug, for example.

Figure 1:
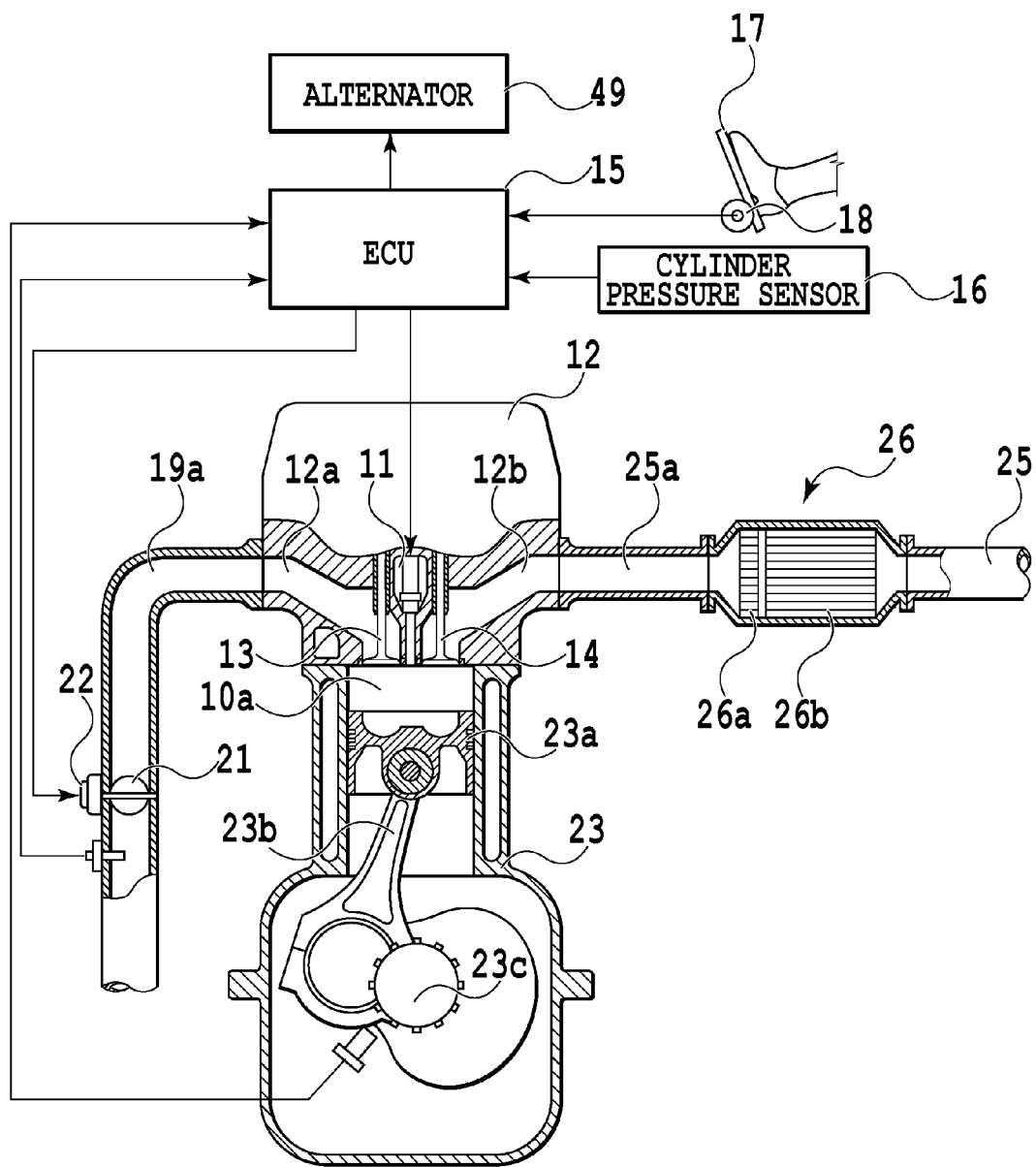
FIG. 1 is a conceptual drawing of an embodiment in which the present invention is applied to a vehicle equipped with a compression ignition multicylinder internal combustion engine.
Figure 2:
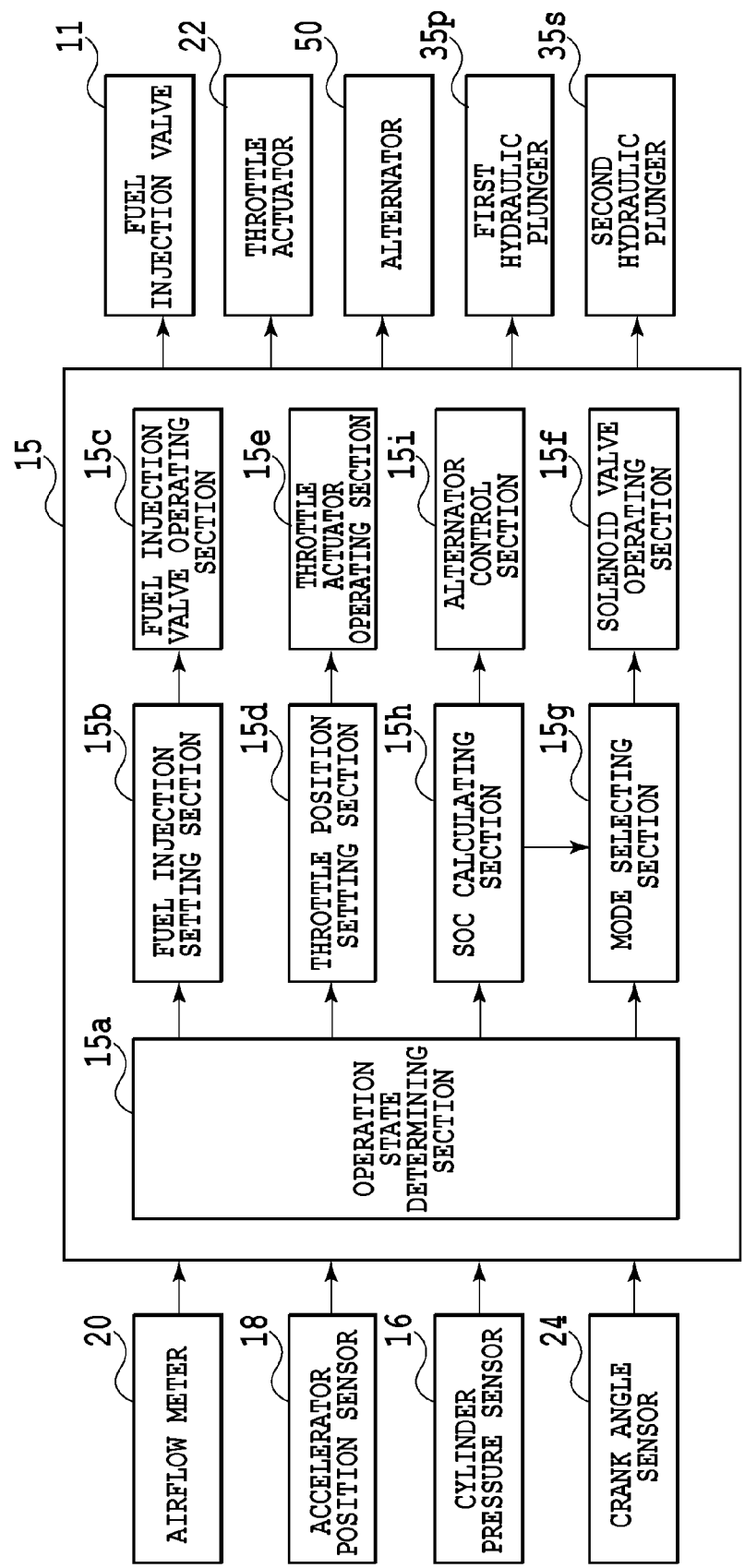
FIG. 2 is a control block diagram of a main portion of the embodiment depicted in FIG. 1.

FIG. 1 schematically shows a primary portion of an engine system in the present embodiment, and FIG. 2 schematically shows a control block of the primary portion. In FIG. 1, an exhaust turbo-charger, an EGR system, and the like which are generally provided as auxiliaries for the engine 10 are omitted. It should also be noted that some of various sensors needed for a smooth operation of the engine 10 are also omitted for convenience.

The engine 10 according to the present embodiment is a compression-ignition multicylinder internal combustion engine that spontaneously ignites light oil, biofuel, or a mixture thereof as a fuel by injecting the fuel directly into a combustion chamber 10a in a compressed state through a fuel injection valve 11. However, according to the characteristics of the present invention, the engine 10 also may be a single-cylinder internal combustion engine.

A cylinder head 12 includes an intake port 12a and an exhaust port 12b formed therein and each located opposite a combustion chamber 10a, and incorporates a valve operating mechanism (not shown in the drawings) including an intake valve 13 that opens and closes the intake port 12a and an exhaust valve 14 that opens and closes the exhaust port 12b. The fuel injection valve 11 located opposite the center of an upper end of the combustion chamber 10a is also assembled to the cylinder head 12 so as to be sandwiched between the intake valve 13 and the exhaust valve 14. A cylinder pressure sensor 16 that detects and outputs a change in the pressure in the combustion chamber 10a to an ECU (Electronic Control Unit) 15 is also assembled in the cylinder head 12 in each cylinder adjacently to the fuel injection valve 11 so as to be sandwiched between the intake valve 13 and the exhaust valve 14.

The amount of fuel fed into the combustion chamber 10a through the fuel injection valve 11 as well as injection timing are controlled by an ECU 15 based on the operating status of the vehicle including the position of an accelerator pedal 17 pressed by a driver. The position of the pressed accelerator pedal 17 is detected as an accelerator opening degree by an accelerator opening sensor 18, which then outputs detection information to the ECU 15.

The ECU 15 is a well-known one-chip microprocessor, and includes a CPU, a ROM, a RAM, a nonvolatile memory, an input/output interface, and the like that are connected to each other via a data bus, not shown. The ECU 15 in the present embodiment includes an operational state determining section 15a that determines the operational state of a vehicle based on information output from the cylinder pressure sensor 16, the accelerator position sensor 18 or various sensors, described later, a fuel injection setting section 15b, and a fuel injection valve operating section 15c. The fuel injection setting section 15b sets the quantity and injection timing of fuel injected through the fuel injection valve 11 based on the determination result in the operational state determining section 15a. The fuel injection valve operating section 15c controls the operation of the fuel injection valve 11 such that the quantity of fuel set in the fuel injection setting section 15b is injected through the fuel injection valve 11 at the set timing.

An intake pipe 19 connected to the intake port 12a of the cylinder head 12 defines an intake passage 19a together with the intake manifold 12a. An airflow meter 20 is mounted upstream of the intake pipe 19. Information on an intake flow rate detected by the airflow meter 20 is input into the ECU 15. The fuel injection setting section 15b of the ECU 15 also corrects a quantity of fuel injected from the fuel injection valve 11 based on the information detected by the airflow meter 20 and the like. A throttle valve 21 for adjusting the opening of the intake passage 19a and a throttle actuator 22 for driving the throttle valve 21 are disposed on the intake pipe 19 downstream of the airflow meter 20.

The ECU 15 further includes a throttle position setting section 15d and an actuator operating section 15e. The throttle position setting section 15d sets the opening degree of the throttle valve 20 based on the determination result in the operation state determining section 15a in addition to information on accelerator opening degree $\theta_O$ from the accelerator position sensor 18. The actuator operating section 15e controls the operation of the throttle actuator 22 in such a manner as to open the throttle valve 21 at the opening degree set in the throttle position setting section 15d.

To a cylinder block 23, in which a piston 23a reciprocates, is attached a crank angle sensor 24 which detects a rotation phase, that is, a crank angle of a crankshaft 23c with the piston 23a connected thereto via a connecting rod 23b, and then, outputs it to the ECU 15.

The operation state determining section 15a of the ECU 15 grasps the rotation phase of the crankshaft 23c, an engine speed $N_E$, the vehicle speed or the travel speed of the vehicle $V_V$, and the like in real time based on information output from the crank angle sensor 24. In the present embodiment, the operation state determining section 15a calculates the travel speed of the vehicle, that is, the vehicle speed $V_V$. However, a vehicle speed sensor or the like may be used to detect the vehicle speed $V_V$.

Figure 3:
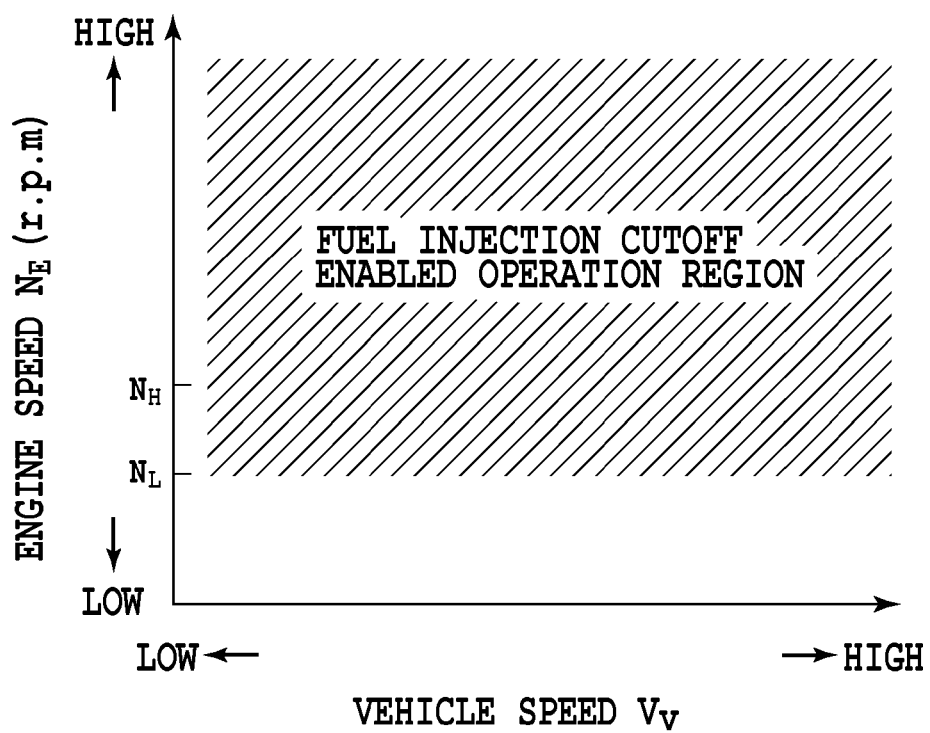
FIG. 3 is a map schematically illustrating the relation between a vehicle speed and an engine speed and a fuel cutoff enabled operation region in the embodiment depicted in FIG. 1.

The ECU 15 stores a fuel injection cutoff enabled operation region preset based on the engine speed $N_E$ as depicted in FIG. 3. The fuel injection cutoff enabled operation region is an operation region within which the engine is prevented from being stalled even when the supply of fuel is completely stopped during traveling of the vehicle. The fuel injection cutoff enabled operation region corresponds to a range with a fuel injection cutoff determination threshold $N_L$ or larger. Of course, the fuel injection cutoff determination threshold $N_L$ is corrected according to the temperature of engine cooling water, the presence or absence of the load of an accessory, a warm-up process for a catalyst, and the like. In the present embodiment, if the accelerator opening degree $\theta_O$ is 0%, that is, the accelerator is released, while the engine speed $N_E$ is equal to or higher than the fuel injection cutoff determination threshold $N_L$, that is, while the vehicle is traveling in the fuel injection cutoff enabled operation region, fuel injection through the fuel injection valve 11 is temporarily blocked to suppress wasteful fuel consumption. In this case, if the stoppage of fuel supply reduces the engine speed $N_E$ below the fuel injection cutoff determination threshold $N_L$ to cause the vehicle to deviate from the fuel injection cutoff enabled operation region, the fuel injection is restarted to prevent the engine from being stalled. The operation state determining section 15a of the ECU 15 functions as means of the present invention for determining whether or not the engine is within the fuel injection cutoff enabled operation region.

The exhaust pipe 25 connected to the cylinder head 12 in such a manner as to communicate with the exhaust port 12b defines an exhaust passage 25a together with the exhaust port 12b. An exhaust gas purifying device 26 adapted to detoxify harmful substance generated by combustion of a gas mixture in the combustion chamber 10a is mounted on the way of the exhaust pipe 25 located upstream of the muffler, not illustrated, attached to a downstream end. The exhaust gas purifying device 26 in the present embodiment includes DPF (Diesel Particulate Filter) 26a and DOC (Diesel Oxidation Catalytic converter) 26b. Catalytic converters other than the DPF 26a and the DOC 26b may further be assembled into the exhaust gas purifying device 26.

A variable valve operating system 27 enables changes in the valve timing and valve opening stroke of the intake valve/exhaust valve 13, 14 in accordance with a preset program so as to obtain a preferable output property according to the operation state of the vehicle. The exhaust valve 14 will be described below in order to avoid redundant description. However, a similar configuration may be adopted for the intake valve 13 in order to obtain the desired property.

Figure 4:
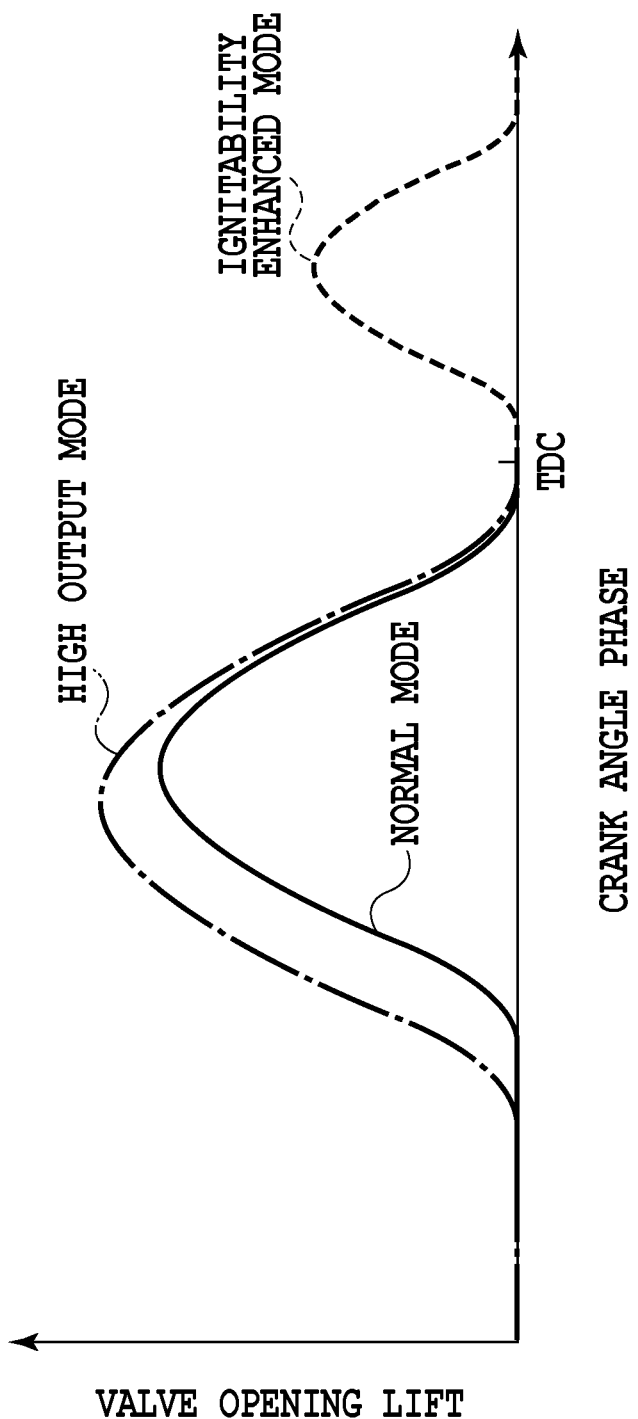
FIG. 4 is a graph illustrating the relation between a crank angle phase and a valve opening lift of an exhaust valve according to the embodiment depicted in FIG. 1.

In the present embodiment, the variable valve operating system 27 is configured to obtain such a valve opening lift as depicted in FIG. 4 for the exhaust valve 14. That is, the exhaust valve 14 can be switched between an ignitability enhanced mode selected for a low-load low-rotation region for the engine 10 and a high output mode selected for a high-load high-rotation region for the engine 10 and a normal mode selected for the other regions. The ignitability enhanced mode is depicted by a solid line and a dashed line in FIG. 4. In the ignitability enhanced mode, a portion of hot exhaust gas is guided into the combustion chamber 10a to raise an intake temperature, thus enhancing the ignitability of the fuel. The high output mode is depicted by an alternate long and short dash line in FIG. 4. In the high output mode, the exhaust valve 14 is opened at substantially the same timing as that at which the exhaust valve 14 is opened in the normal mode, but the valve opening lift is set higher than that in the normal mode, allowing for an increase in exhaust efficiency. The normal mode selected for the regions for the engine 10 other than the low-load low-rotation region and the high-load high-rotation region is depicted by a solid line in FIG. 4. In the normal mode, the valve opening timing is later than that in the high output mode, and the valve opening lift is set lower than in the high output mode. In any of the modes, the pair of exhaust valves 14 performs the same operation.

The valve opening lift illustrated in FIG. 4 is only an example, and any valve opening lift curve may be set according to a desired property.

Figure 5:
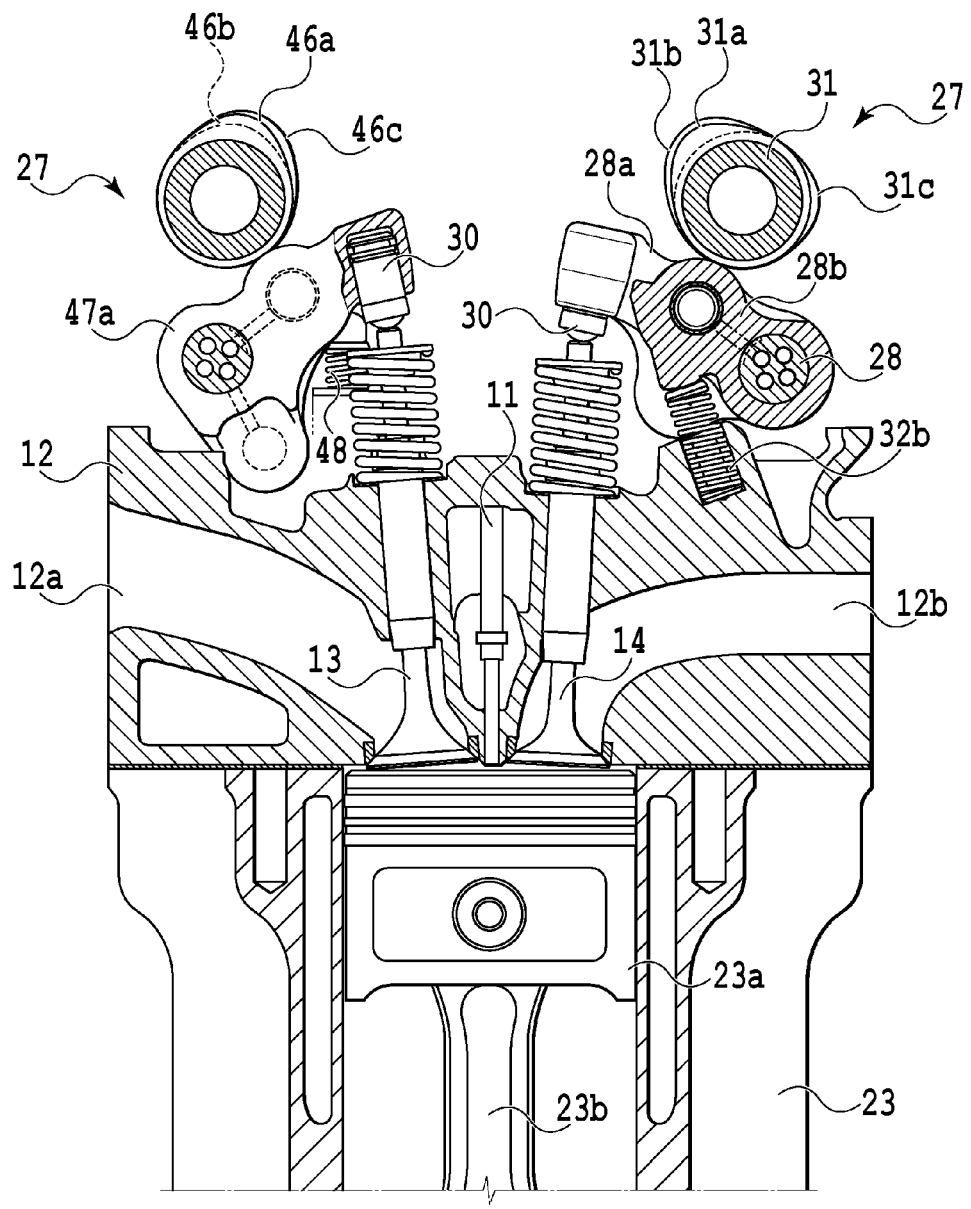
FIG. 5 is an enlarged sectional view of an extracted main portion of the variable valve operating system according to the embodiment depicted in FIG. 1.
Figure 6:
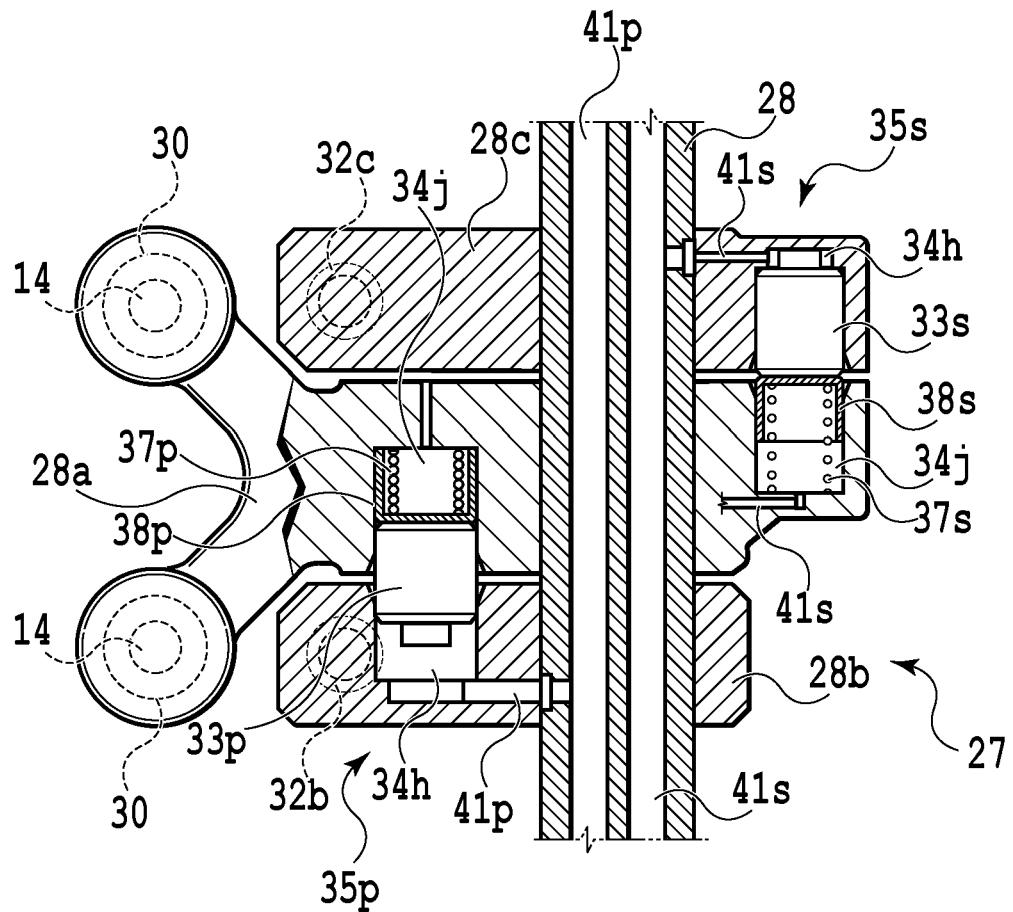
FIG. 6 is a developed sectional view schematically depicting the structure of an exhaust valve rocker arm in the embodiment depicted in FIG. 1.
Figure 7:
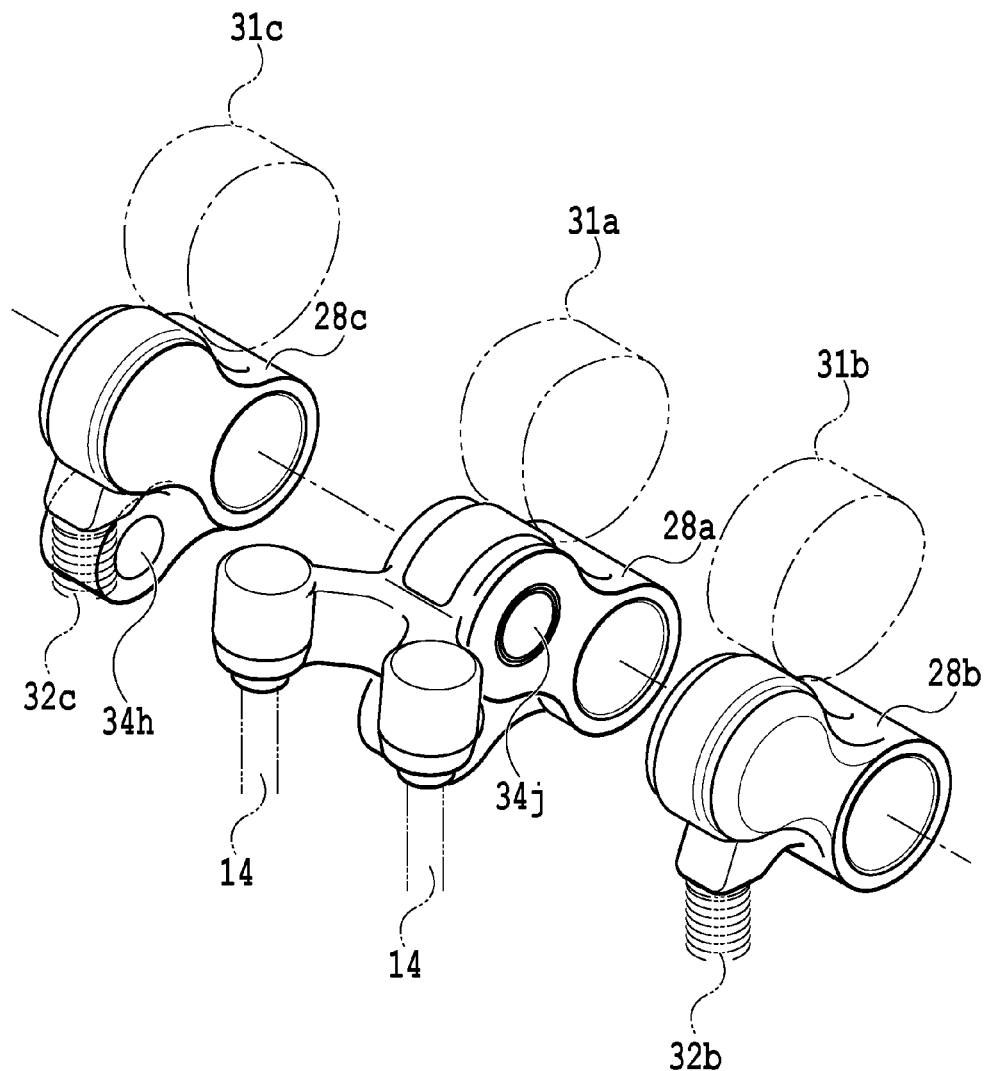
FIG. 7 is a perspective view depicting a part of FIG. 6 corresponding to the exhaust valve rocker arm in a disassembled state.

FIG. 5 is an enlarged view of the extracted variable valve operating system 27 portion that allows each of the above-described modes to be selected. FIG. 6 schematically depicts the sectional structure of a rocker arm portion that actuates the exhaust valve 14. FIG. 7 depicts the appearance of the disassembled rocker arm. That is, the variable valve operating system 27 in the present embodiment includes a first to a third rocker arms 28a, 28b, and 28c and two switching means 29p and 29s.

The first rocker arm 28a attached to a rocker arm shaft 28 so as to be able to rock is contact with the pair of exhaust valves 14 via auto lash adjusters 30. A first cam 31a formed on a cam shaft 31 that rotates synchronously with a crankshaft 23c is pressed against the first rocker arm 28a. The second and third rocker arms 28b and 28c are attached to the rocker arm shaft 28 so as to be able to rock such that the first rocker arm 28a is sandwiched between the second rocker arm 28b and the third rocker arm 28c. The second and third rocker arms 28b and 28c are biased by lost motion springs 32b and 32c, respectively, so as to be constantly contact with the second and third cams 31b and 31c on the cam shaft 31. Normally, the spring force of the second lost motion spring 32c is set much higher than the spring force of the first lost motion spring 32b to ensure that the exhaust valve 14 is opened and closed in accordance with the cam profile of the third cam 31c.

The switching means 29p and 29s that bridge over the first and second rocker arms 28a and 28b and over the first and third rocker arms 28a and 28c, respectively, include coupling pins 33p and 33s, respectively, and both include a holding pin hole 34h and a coupling pin hole 34j.

The coupling pin 33p of the first switching means 29p bridging over the first and second rocker arms 28a and 28b is used to integrally couple the first and second rocker arms 28a and 28b together in a predetermined phase. The coupling pin 33p is fitted into the holding pin hole 34h and the coupling pin hole 34j formed in the first and second rocker arms 28a and 28b, respectively, such that the coupling pin 33p can slide along a direction parallel to the axis of the rocker arm shaft 28. In the present embodiment, the holding pin hole 34h is formed in the first rocker arm 28a to hold one end of the coupling pin 33p, whereas the coupling pin hole 34j is formed in the second rocker arm 28b to allow the other end of the coupling pin 33p to be fitted into the coupling pin hole 34j.

The coupling pin 33s of the second switching means 29s bridging over the first and third rocker arms 28a and 28c is used to integrally couple the first and third rocker arms 28a and 28c together in a predetermined phase. The coupling pin 33s is fitted into the holding pin hole 34h and the coupling pin hole 34j formed in the first and third rocker arms 28a and 28c, respectively, such that the coupling pin 33s can slide along a direction parallel to the axis of the rocker arm shaft 28. In the present embodiment, the holding pin hole 34h is formed in the third rocker arm 28c to hold one end of the coupling pin 33s, whereas the coupling pin hole 34j is formed in the first rocker arm 28a to allow the other end of the coupling pin 33s to be fitted into the coupling pin hole 34j.

In the present embodiment, the coupling pin hole 34j is formed in the first rocker arm 28a, and the holding pin hole 34h is formed in each of the second and third rocker arms 28b and 28c. However, this arrangement may be reversed. That is, the holding pin hole 34h may be formed in the first rocker arm 28a, and the coupling pin hole 34j may be formed in each of the second and third rocker arms 28b and 28c.

When the other end of each of the coupling pins 33p and 33s is not fitted into the coupling pin hole 34j (see FIG. 8), the pair of exhaust valves 14 is opened in accordance with the cam profile of the first cam 31a. In contrast, the second and third rocker arms 28b and 28c run idly and are not involved in opening or closing of the exhaust valve 14. This state corresponds to the above-described normal mode.

In the normal mode, when the other end of the coupling pin 33p is fitted into the coupling pin hole 34j in the first switching means 29p as depicted in FIG. 6, the first and second rocker arms 28a and 28b integrally rock. The exhaust valve 14 is thus opened and closed in accordance with the combined cam profile of the first cam 31a and the second cam 31b. In the present embodiment, the distance by which the exhaust valve 14 is lifted by the first cam 31a is set larger than the distance by which the exhaust valve 14 is lifted by the second cam 31b, all over a rotation area. Thus, with the first and second rocker arms 28a and 28b integrally coupled together, the exhaust valve 14 is opened and closed in accordance with the cam profile of the second cam 31b. Also in this state, the third rocker arms 28c runs idly and is not involved in opening or closing of the exhaust valve 14. This state corresponds to the above-described high output mode.

On the other hand, in the normal mode, when the other end of the coupling pin 33s is fitted into the coupling pin hole 34j in the second switching means 29s as depicted in FIG. 6, the first and third rocker arms 28a and 28c integrally rock. The exhaust valve 14 is thus opened and closed in accordance with the combined cam profile of the first cam 31a and the third cam 31c. In the present embodiment, the valve timings when the exhaust valve 14 is opened and closed by the first cam 31a are totally different from the valve timings when the exhaust valve 14 is opened and closed by the third cam 31c. Consequently, the operation of opening and closing the exhaust valve 14 is performed twice, that is, during an exhaust stroke and during an intake stroke. Thus, with the first and third rocker arms 28a and 28c integrally coupled together, the exhaust valve 14 is opened and closed in accordance with the cam profiles of the first and third cams 31a and 31c. This state corresponds to the above-described ignitibility enhanced mode.

Figure 8:
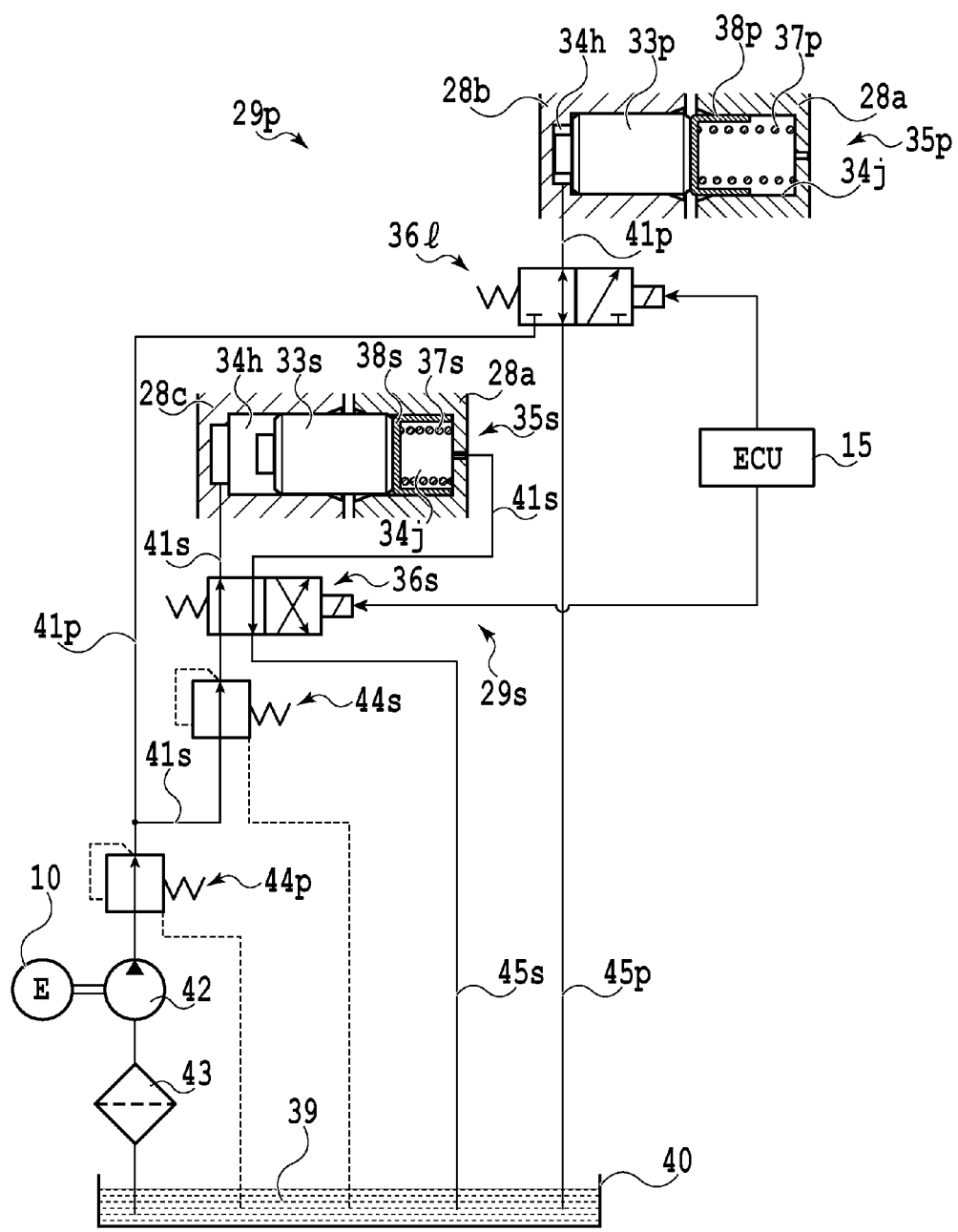
FIG. 8 is a diagram of a hydraulic circuit related to switching means in the embodiment depicted in FIG. 1.

The switching means 29p and 29s are hydraulically controlled so as to allow the coupling pins 33p and 33s to be independently switched between the state where the other end of each coupling pin is fitted into the coupling pin hole 34j and the state where the other end of the coupling pin is not fitted into the coupling pin hole 34j. In the present embodiment, the switching means 29p and 29s include hydraulic plungers 35p and 35s, solenoid valves 36p and 36s, and a solenoid valve operating section 15f of the ECU 15 that controls the operation of the solenoid valves 36p and 36s, along with a hydraulic circuit as depicted in FIG. 8. The hydraulic plungers 35p and 35s include compression coil springs 37p and 37s each housed in the coupling pin hole 34j and stoppers 38p and 38s. The compression coil springs 37p and 37s exert such bias forces as push the other ends of the coupling pins 33p and 33s in the fitted state as depicted in FIG. 6, out through the coupling pin hole 34j. When the coupling pin 33p is not fitted into the coupling pin hole 34j as depicted in FIG. 8, a tip portion of the compression coil spring 37p is positioned substantially midway between the first and second rocker arms 28a and 28b located adjacently to each other. Then, in conjunction with rocking of the first and second rocker arms 28a and 28b, the other end surface of the coupling pin 33p comes into sliding contact with the stopper 38p installed at the tip of the compression coil spring 37p. Also when the coupling pin 33s is not fitted into the coupling pin hole 34j, a tip portion of the compression coil spring 37s is positioned substantially midway between the first and third rocker arms 28a and 28c located adjacently to each other. Then, in conjunction with rocking of the first and third rocker arms 28a and 28c, the other end surface of the coupling pin 33s comes into sliding contact with the stopper 38s installed at the tip of the compression coil spring 37p.

The hydraulic circuit in the present embodiment depicted in FIG. 8 has a first oil passage 41p leading from an oil sump 40 with hydraulic oil (lubricant for internal combustion engines) to the holding pin hole 34h of the hydraulic plunger 35p. A second oil passage 41s diverging from the first oil passage 41p communicates with the holding pin hole 34h or the coupling pin hole 34j in the second hydraulic plunger 35s. In the first oil passage 41p, an oil pump 42 is arranged which is coupled to the engine 10 via the crankshaft 23c. On a downstream side with respect to the oil pump 42 in the first oil passage 41p, a first pressure regulating valve 44p is arranged which regulates hydraulic oil 39 pumped up by the oil pump 42 from the oil sump 40 via an oil filter 43, to a first predetermined pressure. Between the first pressure regulating valve 44p and the first hydraulic plunger 35p in the first oil passage 41p, the first solenoid valve 36p is arranged to feed and discharge pressure oil to and from the first hydraulic plunger 35p. The first solenoid valve 36p connects to a first return oil passage 45p that communicates with the oil sump 40.

When a current is passed through the first solenoid valve 36p, pressure oil can be fed through the first oil passage 41p to the holding pin hole 34h in the first hydraulic plunger 35p, and the first and second rocker arms 28a and 28b are switched to the coupled state. On the other hand, when no current is passed through the first solenoid valve 36p, the holding pin hole 34h in the first hydraulic plunger 35p is allowed to communicate with the return oil passage 45p. The spring force of the compression coil spring 37p causes the first and second rocker arms 28a and 28b to be switched to the uncoupled state.

A second pressure regulating valve 44s is arranged in the second oil passage 41s to further reduce the pressure of the pressure oil previously regulated to the first predetermined value. The second solenoid valve 36s is arranged between the second pressure regulating valve 44s and the second hydraulic plunger 35s in the second oil passage 41s. The other end of the second hydraulic plunger 35s and the oil sump 40 communicate with each other through the second return oil passage 45s via the second solenoid valve 36s.

When no current is passed through the second solenoid valve 36s, pressure oil flowing through the second oil passage 41a is fed to the coupling pin hole 34j in the second hydraulic plunger 35s. Furthermore, the holding pin hole 34h in the second hydraulic plunger 35s communicates with the second return oil passage 45s. Thus, the first and third rocker arms 28a and 28c are switched to the uncoupled state. In contrast, when a current is passed through the second solenoid valve 36a, pressure oil flowing through the second oil passage 41s is fed to the holding pin hole 34h in the second hydraulic plunger 34h in the second hydraulic plunger 35s. Furthermore, the coupling pin hole 34j in the second hydraulic plunger 35s communicates with the second return oil passage 45a. Thus, the first and third rocker arms 28a and 28c are switched to the coupled state.

Turn-on or -off of current flow through the first and second solenoid valves 36p and 36s can be independently controlled by the solenoid valve operating section 15f of the ECU 15. The above-described hydraulic circuit is illustrative, and may of course be changed as needed according to the desired property.

Figure 9:
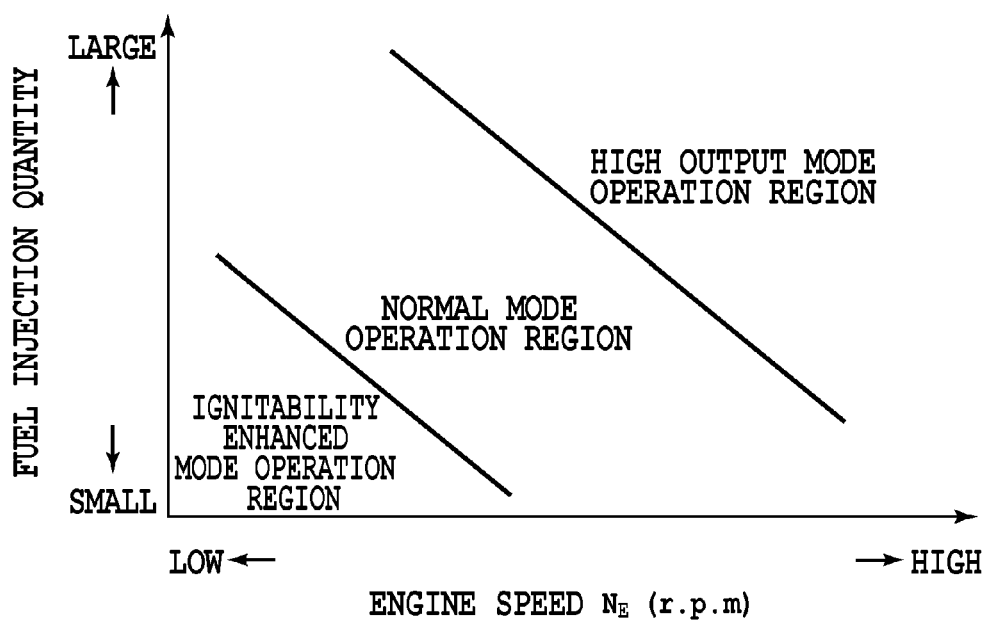
FIG. 9 is a map schematically illustrating the relation between the engine speed and a fuel injection quantity and each mode of the variable valve operating system in the embodiment depicted in FIG. 1.

The ignitability enhanced mode, high output mode, and normal mode of the exhaust valve 14 described above are read from a map stored in a mode selecting section 15g as depicted in FIG. 9, based on the engine speed $N_E$ and the fuel injection quantity, and are then output to the solenoid valve operating section 15f. The solenoid valve operating section 15f feeds and discharges pressure oil to and from the first and second hydraulic plungers 35p and 35s so as to place the variable valve operating system 27 in the mode selected by the mode selecting section 15g. The above-described control is hereinafter referred to as valve operating output control; in the control, based on the engine speed $N_E$ and the fuel injection quantity, pressure oil is fed to and discharged from the first and second hydraulic plungers 35p and 35s so as to establish the mode selected by the mode selecting section 15g of the ECU 15.

In the present embodiment, the operation state determining section 15a of the ECU 15 can reliably determine that the coupling pins 33p and 33s are switched to the unfitted state and to the fitted state with respect to the coupling pin hole 34j based on detection information from the cylinder pressure sensor 16. This mechanism is described in detail in Japanese Patent Laid-Open No. 2015-34534 to the applicant and will be described below in brief. However, any technique other than the described technique may be used to switch the coupling pins 33p and 33s from the unfitted state to the fitted state with respect to the coupling pin hole 34j. That is, the operation state determining section 15a calculates the rate of change in the internal pressure of each cylinder detected by the cylinder pressure sensor 16, in association with a change in crank angle phase. The calculated rate of change in cylinder pressure varies among those of the rocker arms 28a to 28c which actually act on the opening of the exhaust valve 14. In particular, the crank angle phase in which an inflection point of the rate of change in cylinder pressure is positioned varies significantly among those of the rocker arms 28a to 28c which actually act on the opening of the exhaust valve 14. Therefore, those of the rocker arms 28a to 28c which actually act on the opening of the exhaust valve 14 can be estimated based on the crank angle phase containing the inflection point of the rate of change in cylinder pressure acquired by the operation state determining section 15a. This enables determination of whether or not the estimated rocker arms 28a to 28c are the rocker arms 28a to 28c corresponding to the selected mode.

The variable valve operating system 27 configured to operate the intake valve 13 according to the present embodiment will be described below in brief. That is, the first and second intake valves 13 in the present embodiment are configured to be able to be individually independently opened and closed. The first intake valve 13 is operated by a first cam 46a via a first rocker arm 47a. The second intake valve 13 can be operated by a second cam 46b via a second rocker arm (not depicted in the drawings) so as to provide a valve opening lift that is smaller than the valve opening lift given by the first cam 46a. The pair of intake valves 13 can be operated by a third cam 46c via a third rocker arm (not shown in the drawings) so as to provide a valve opening lift that is larger than the valve opening lift given by the first cam 46a. A spring force is applied to the third rocker arm by a lost motion spring 48. The coupling state of the three rocker arms is switched by switching means not depicted in the drawings and which is similar to the switching means for the exhaust valve.

As described above, if the accelerator opening degree $\theta_O$ is 0% when the vehicle is traveling in the fuel injection cutoff enabled operation region, fuel injection through the fuel injection valve 11 is temporarily stopped to suppress wasteful fuel consumption. For the valve operating output control in this state, the high output mode or normal mode of the variable valve operating system 27 is selected. When the spring force of the lost motion springs 32b and 32c is considered to be the internal resistance of the engine 10, the selected mode may not be optimum. In the present invention, in such a state, valve operating mechanism internal-resistance control is performed in which the requested quantity of increase or decrease in the internal resistance of the engine 10 is determined and in which the mode of the variable valve operating system 27 optimum for the requested quantity of increase or decrease is selected so that switching to the selected mode is executed as needed. The valve operating mechanism internal-resistance control in the present embodiment is performed only when the engine speed $N_E$ is equal to or higher than a valve operating mechanism internal-resistance control determination threshold $N_H$ that is larger than the fuel injection cutoff determination threshold $N_L$. The present embodiment incorporates the charging rate of a secondary battery mounted in the vehicle and the effectiveness of the engine brake as a target for the request for increase or decrease in the internal resistance of the engine 1. Therefore, the requested quantity of increase or decrease in internal resistance can be determined based on the charging rate of the battery or the deceleration of the vehicle.

The ECU 15 in the present embodiment further has a SOC calculating section 15h that estimates the SOC (State of Charge) of the secondary battery and an alternator control section 15i configured to drive the alternator 49 based on the result of the calculation by the SOC calculating section 15h. The alternator control section 15i basically completely stops the function of the alternator 49 when charging is likely to significantly shorten the life of the battery, for example, when the SOC is 80% or more. In contrast, the alternator control section 15i maximizes the quantity of power generated by the alternator 49 when there is no possibility that charging shortens the life of the battery, for example, when the SOC is less than 60%. When the SOC is, for example, between 80% and 60%, the alternator control section 15i controls a field current such that the quantity of power generated by the alternator 49 is adjusted according to the value of the SOC. In other words, the present embodiment sets, for the requested quantity of increase or decrease in internal resistance, a case where the SOC is equal to or more than 80%, a case where the SOC is less than 60%, and a case where the SOC is between 80% and 60%.

The above-described values of the SOC according to which the quantity of power generated by the alternator 49 is switched are illustrative and of course vary depending on the type of the secondary battery or the like. A calculation method for the SOC is known from, for example, Japanese Patent Laid-Open No. 2012-165589 and will thus not be described in further detail.

Figure 10:
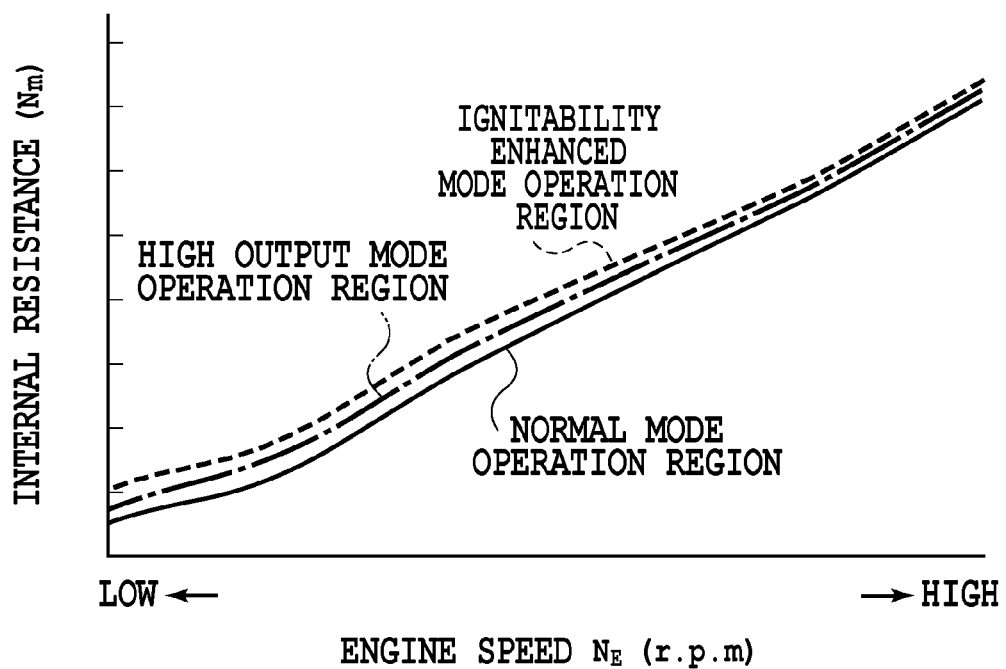
FIG. 10 is a graph illustrating the relation between the engine speed and internal resistance in each mode of the variable valve operating system which relation is observed when the engine is operated by a motor in the embodiment depicted in FIG. 1.

FIG. 10 illustrates the relation between the engine speed $N_E$ obtained when the engine 10 is operated by a motor and the corresponding internal resistance of the variable valve operating system 27 in each mode. The unit of the scale on the axis of ordinate is 1 Nm. A solid line in FIG. 10 indicates the case of the normal mode with no effects of the spring forces of the lost motion springs 32b and 32c. An alternate long and short dash line indicates the high output mode in which the spring force of the lost motion spring 32b is applied as internal resistance. A dashed line indicates the ignitability enhanced mode in which the spring force of the lost motion spring 32c is applied as internal resistance. As described above, the internal resistance of the variable valve operating system 27 increases in an order of the normal mode, the high output mode, and the ignitability enhanced mode, and the spring forces of the lost motion springs 32b and 32c can be allowed to function as the internal resistance. Thus, the mode selecting section 15g in the present embodiment changes the internal resistance of the variable valve operating system 27 to the optimum resistance when the engine speed $N_E$ is equal to or higher than the valve operating mechanism internal-resistance control determination threshold $N_H$ and the throttle opening degree is 0%. Based on the result of the calculation by the SOC calculating section 15h, the mode selecting section 15g in the present embodiment selects the normal mode with the lowest internal resistance when the SOC is less than 60%. In contrast, when the SOC is equal to or more than 80%, the secondary battery need not be charged, and thus, the ignitability enhanced mode with the highest internal resistance of the variable valve operating system 27 is selected to make the engine brake more effective. When the SOC is between 80% and 60%, the high output mode is selected in which only the spring force of the lost motion spring 32b is exerted as the internal resistance of the engine 10.

Figure 11:
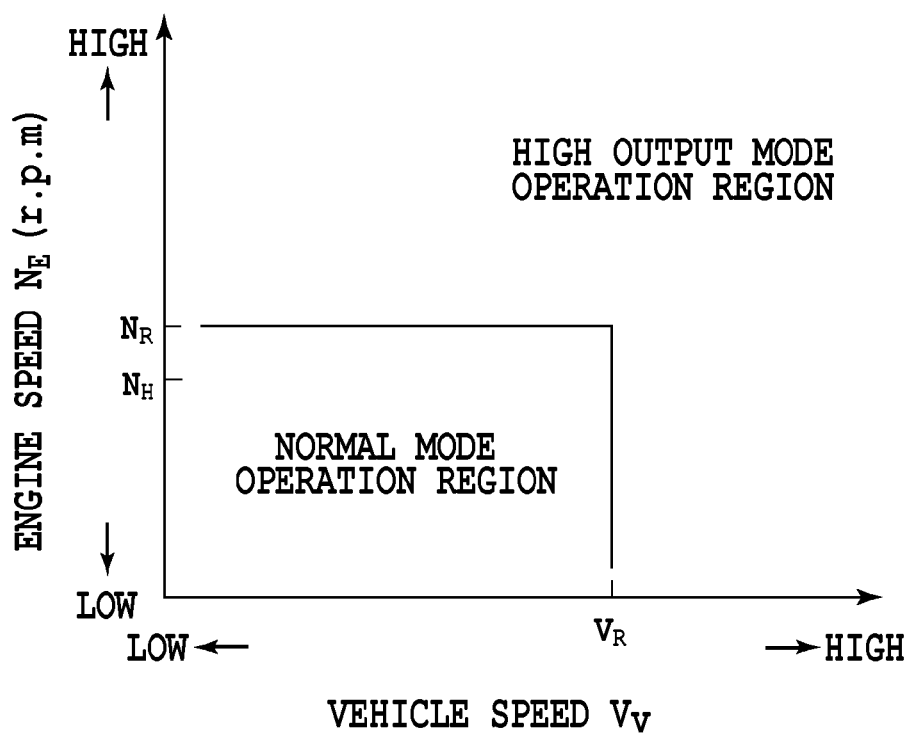
FIG. 11 is a map schematically illustrating the relation between the vehicle speed and the engine speed and each mode of the variable valve operating system in the embodiment depicted in FIG. 1.

In regard to the effectiveness of the engine brake, when the deceleration of the vehicle, that is, the absolute value of a negative acceleration $\alpha_V$ is smaller than a preset positive threshold $\alpha_L$, the high output mode with the highest internal resistance of the variable valve operating system 27 is selected to make the engine brake more effective. In contrast, when the absolute value of the deceleration $\alpha_V$ of the vehicle is equal to or larger than a preset positive value $\alpha_H$ ($\alpha_H > \alpha_L$), the mode selecting section 15g determines that the engine brake is sufficiently effective to select the normal mode with the lowest internal resistance of the variable valve operating system 27 to suppress a decrease in fuel efficiency. When the absolute value of the deceleration $\alpha_V$ of the vehicle is between the above-described two thresholds $\alpha_L$ and $\alpha_H$, the mode selecting section 15g selects the high output mode in which only the spring force of the lost motion spring 32b is applied as the internal resistance of the engine 10. In other words, the present embodiment sets, for the requested quantity of increase or decrease in internal resistance, the case where the absolute value of the deceleration $\alpha_V$ of the vehicle is smaller than the threshold $\alpha_L$, the case where the absolute value of the deceleration $\alpha_V$ of the vehicle is equal to or larger than the threshold $\alpha_L$, ($\alpha_H > \alpha_L$), and the case where the absolute value of the deceleration $\alpha_V$ of the vehicle is between the thresholds $\alpha_L$ and $\alpha_H$. Moreover, the mode selecting section 15g in the present embodiment stores a map preset based on the vehicle speed $V_V$ and the engine speed $N_E$ as depicted in FIG. 11. That is, when the vehicle speed $V_V$ is equal to or lower than a preset threshold $V_R$ and the engine speed $N_E$ is lower than a preset threshold $N_R$, the normal mode with the lowest internal resistance of the variable valve operating system 27 is selected to increase the idle running distance of the vehicle. In contrast, when the vehicle speed $V_V$ is higher than the preset threshold $V_R$, the high output mode in which only the spring force of the lost motion spring 32b is applied as the internal resistance of the engine 10 is selected to reduce the idle running distance of the vehicle. However, in the present embodiment, the result of the calculation by the SOC calculating section 15h is given priority, and the mode of the variable valve operating system 27 is selected based on the deceleration $\alpha_V$, vehicle speed $V_V$, and engine speed $N_E$ of the vehicle only when the battery need not be charged. The above-described threshold $N_R$ corresponds to an engine speed $N_E$ higher than the valve operating internal-resistance control determination threshold $N_H$.

Therefore, the above-described operation state determining section 15a and mode selecting section 15g of the ECU 15 function as means of the present invention for setting the requested quantity of increase or decrease in the internal resistance of the engine 10 according to the situation of the vehicle.

Figure 12:
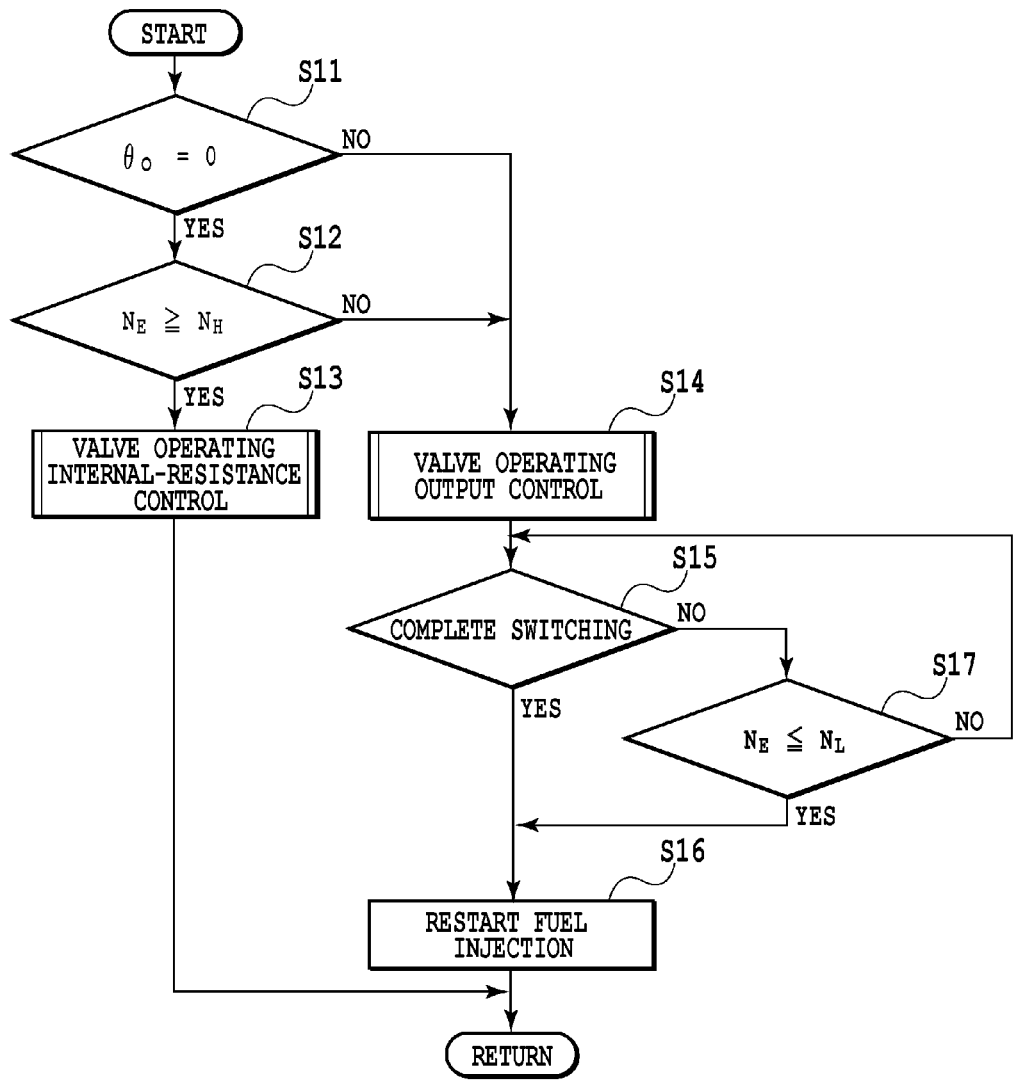
FIG. 12 is a flowchart illustrating a procedure used to select each mode in the embodiment depicted in FIG. 1.

A mode selection procedure for the variable valve operating system 27 according to the present embodiment will be described below with reference to FIG. 12 and FIG. 13. First, in step S11, whether or not the accelerator opening degree $\theta_O$ is 0% is determined. Upon determining that the accelerator opening degree $\theta_O$ is 0%, that is, that a driver is not stepping on the accelerator pedal 17, the ECU shifts to step S12 to determine whether or not the engine speed $N_E$ is equal to or higher than the valve operating mechanism internal-resistance control determination threshold $N_H$. Upon determining that the engine speed $N_E$ is equal to or higher than the valve operating mechanism internal-resistance control determination threshold $N_H$, that is, that the valve operating mechanism internal-resistance control can be performed, the ECU shifts to step S13 to start the valve operating mechanism internal-resistance control.

Figure 13:
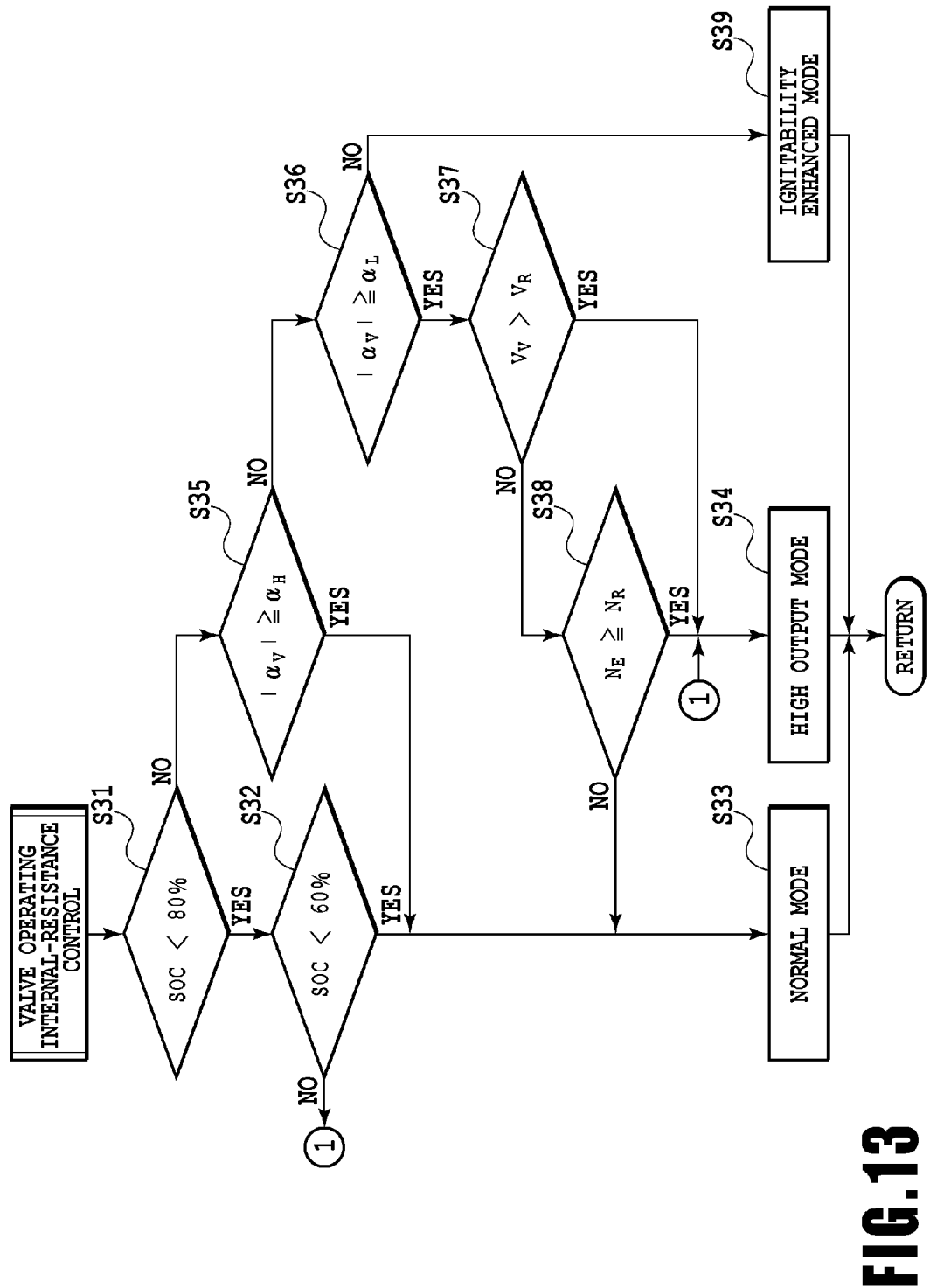
FIG. 13 is a flowchart for a subroutine for valve operating mechanism internal-resistance control illustrated in FIG. 12.

FIG. 13 illustrates a subroutine for the valve operating mechanism internal-resistance control. First, in step S31, whether or not the SOC is less than 80% is determined. Upon determining that the SOC is less than 80%, that is, that the battery is preferably charged, the ECU shifts to step S32 to now determine whether or not the SOC is less than 60%. Upon determining that the SOC is less than 60%, that is, that the quantity of power generated by the alternator 49 needs to be maximized, the ECU shifts to step S33 to select the normal mode of the variable valve operating system 27 so as to minimize the internal resistance of the engine 10, that is, to set the internal resistance equal to or lower than a first predetermined value. Therefore, switching to the normal mode is executed if the vehicle is traveling in the high output mode when the accelerator opening degree $\theta_O$ is 0%. However, if the vehicle is traveling in the normal mode when the accelerator opening degree $\theta_O$ is 0%, the switching means 29p and 29s perform no switching operation. In this case, the internal resistance of the engine 10 resulting from the spring forces of the lost motion springs 32b and 32c is not applied, and thus, loss of regenerative energy can be avoided, enabling more efficient charging. Subsequently, the ECU returns to a main routine illustrated in FIG. 12 to execute processing in S11 and the subsequent steps again.

In the above-described step S32, upon determining that the SOC is equal to or more than 60%, that is, that it is preferable to avoid increasing charging efficiency in order to maintain the long life of the secondary battery, the ECU shifts to step S34. Then, the high output mode of the variable valve operating system 27 is selected to set the internal resistance of the engine 10 to a medium value. Therefore, switching to the high output mode is executed if the vehicle is traveling in the normal mode when the accelerator opening degree $\theta_O$ is 0%. However, if the vehicle is traveling in the high output mode when the accelerator opening degree $\theta_O$ is 0%, the switching means 29p and 29s perform no switching operation. In this case, the internal resistance of the engine 10 resulting from the spring forces of the lost motion springs 32b and 32c is applied to correspondingly reduce the efficiency of the alternator 49, enabling the battery to be more safely charged. Subsequently, the ECU returns to the main routine illustrated in FIG. 12 to execute the processing in S11 and the subsequent steps again.

On the other hand, upon determining that the SOC is equal to or more than 80%, that is, that charging may degrade the secondary battery to shorten the life thereof, the ECU shifts to step S35. The ECU then determines whether or not the deceleration of the vehicle, that is, the absolute value of the negative acceleration $\alpha_V$, is equal or larger than the positive threshold $\alpha_H$. Upon determining that the absolute value $|\alpha_V|$ of the deceleration of the vehicle is equal to or larger than the threshold $\alpha_H$, that is, that the engine brake is sufficiently effective, the ECU shifts to step S33 to select the normal mode of the variable valve operating system 27, thus maximizing the internal resistance to suppress a decrease in fuel efficiency.

In S35, upon determining that the absolute value $|\alpha_V|$ of the deceleration of the vehicle is smaller than the threshold $\alpha_H$, the ECU shifts to step S36 to now determine whether or not the absolute value $|\alpha_V|$ of the deceleration of the vehicle is equal to or larger than the preset threshold $\alpha_L$ ($\alpha_H > \alpha_L$). Upon determining that the absolute value $|\alpha_V|$ of the deceleration of the vehicle is equal to or larger than the preset threshold $\alpha_L$, that is, that the deceleration $\alpha_V$ of the vehicle is between the threshold $\alpha_L$ and the above-described threshold $\alpha_H$, the ECU shifts to step S37 to determine whether or not the vehicle speed $V_V$ is equal to or higher than the threshold $V_R$. Upon determining that the vehicle speed $V_V$ is equal to or higher than the threshold $V_R$, that is, that the engine brake is effective to some degree, the ECU shifts to the above-described step S34 to select the high output mode of the variable valve operating system 27. Thus, the internal resistance of the engine 10 resulting from the spring forces of the lost motion springs 32b and 32c is applied to allow the effect of the engine brake to be correspondingly enhanced.

In step S37, upon determining that the vehicle speed $V_V$ is lower than the threshold $V_R$, that is, that idle running of the vehicle in this state poses no problem, the ECU shifts to step S38 to now determine whether or not the engine speed NE is higher than the preset threshold $N_R$. Upon determining that the engine speed $N_E$ is equal to or higher than the preset threshold $N_R$, that is, that there is no possibility that the engine will be stalled, the ECU shifts to the above-described step S36 to select the high output mode of the variable valve operating system 27. Thus, the internal resistance of the engine 10 resulting from the spring forces of the lost motion springs 32b and 32c is applied to enable a corresponding reduction in idle running distance.

On the other hand, in step S38, upon determining that the engine speed $N_E$ is lower than the threshold $N_R$, that is, that, in this state, the idle running distance of the vehicle is reduced, the ECU shifts to step S33 to select the normal mode of the variable valve operating system 27. Thus, the internal resistance of the engine 10 resulting from the spring forces of the lost motion springs 32b and 32c is not applied, thus enabling an increase in the idle running distance of the vehicle.

On the other hand, upon determining that the absolute value $|\alpha_V|$ of the deceleration of the vehicle is smaller than the threshold $\alpha_L$, that is, that a significant effect of the engine brake is not seen, the ECU shifts to step S39. The ECU then selects the ignitability enhanced mode of the variable valve operating system 27 so as to maximize the internal resistance of the engine 10, that is, to set the set the internal resistance equal to or higher than a second predetermined value that is larger than the first predetermined value. Thus, the strong spring force of the lost motion spring 32c is applied as the internal resistance of the engine 10 to allow the effect of the engine brake to be correspondingly enhanced.

In the above-described procedure, the process of charging the battery is given priority over the effectiveness of the engine brake. However, in contrast, the effectiveness of the engine brake can of course be given priority over the charging process. In other words, in the present invention, the control procedure may be optionally changed according to the priorities desired for a plurality of targets for the request for an increase or a reduction in internal resistance. Such targets for the request for an increase or a reduction in internal resistance include, in addition to the in-vehicle storage battery or the engine brake at the time of deceleration of the vehicle described above, for example, hydraulic oil 40 and engine cooling water for which temperature elevation is preferably promoted in the cold state. Alternatively, it is preferable to set only one of these to be a target for the request for an increase or a reduction in the internal resistance of the engine 10. For example, it is preferable to set only one of the process of charging the secondary battery or the effectiveness of the engine brake to be a target for the request for an increase or a reduction in the internal resistance of the engine 10.

Figure 14:
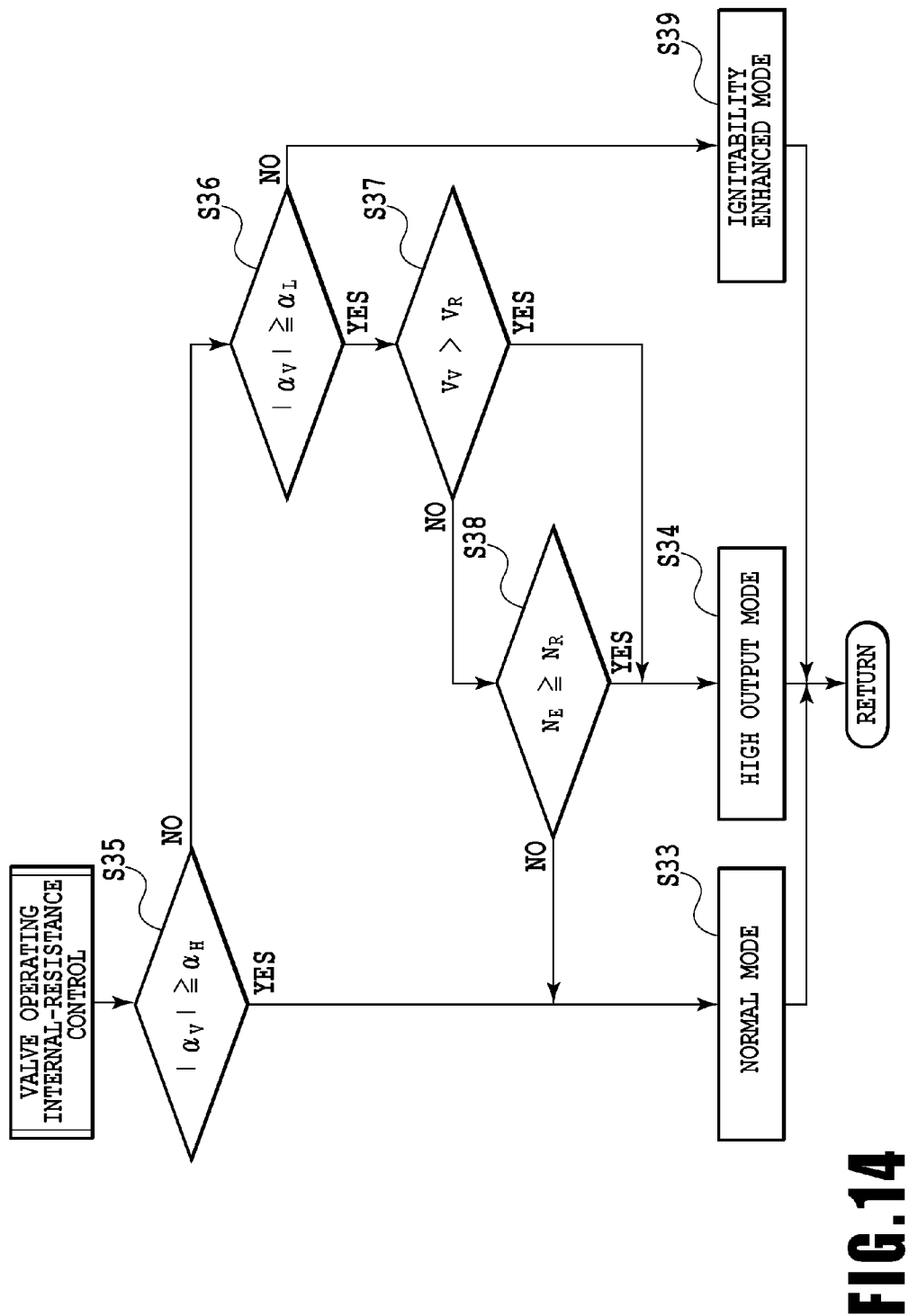
FIG. 14 is a flowchart for a subroutine according to another embodiment for valve operating mechanism internal-resistance control illustrated in FIG. 12.

FIG. 14 illustrates a subroutine for valve operating internal-resistance control in another embodiment of the present invention in which, as described above, only the effectiveness of the engine brake is a target for the request for an increase or a reduction in the internal resistance of the engine 10. The same functions and processes as those in the above-described embodiment depicted in FIG. 13 are denoted by the same reference numerals and step numbers.

After performing the valve operating internal-resistance control as described above, the ECU returns to the main routine described above and illustrated in FIG. 12. Then, upon determining in step S11 that the accelerator opening degree $\theta_O$ exceeds 0% or determining in step S12 that the engine speed $N_E$ is lower than the valve operating internal-resistance control determination threshold $N_H$, that is, that performing the valve operating internal-resistance control is impossible, the ECU shifts to step S14. Then, based on the engine speed $N_E$ and the fuel injection quantity, the valve operating internal-resistance control is performed in accordance with the map illustrated in FIG. 9 to select one of the high output mode, the normal mode, and the ignitability enhanced mode. The ECU then shifts to step S15 to determine whether or not switching to the selected mode has been completed based on information from the cylinder pressure sensor 16. Upon determining that the switching to the selected mode has been completed, the ECU shifts to step S16 to restart fuel injection and then returns to step S11 again. If the fuel injection is restarted before the switching to the selected mode has been completed, the exhaust gas contains more emission, leading to an increased load on the exhaust gas purifying device 26. Thus, it is effective to restart the fuel injection after the completion of the switching to the selected mode is confirmed as in the present embodiment, in order to prevent an increase in the emission contained in the exhaust gas.

On the other hand, upon determining in step S15 that the switching to the selected mode has not been completed, the ECU shifts to step S17 to determine whether or not the engine speed $N_E$ is equal to or higher than the fuel injection cutoff determination threshold $N_L$. Upon determining that the engine speed $N_E$ is equal to or higher than the fuel injection cutoff determination threshold $N_L$, that is, that there is no possibility at present that the engine 10 will be stalled, the ECU repeats the process of shifting to step S15 to determine again whether or not the switching to the selected mode has been completed. However, upon determining in step S15 that the engine speed $N_E$ is lower than the fuel injection cutoff determination threshold $N_L$, that is, that the engine 10 may be stalled, the ECU shifts to step S16 to restart the fuel injection without waiting for the switching to the selected mode to be completed. Consequently, the engine 10 is reliably prevented from being stalled, and subsequently at any point in time, the switching to the selected mode is completed.

As described above, if the accelerator opening degree $\theta_O$ exceeds 0% or the engine speed $N_E$ decreases below the valve operating internal-resistance control determination threshold $N_H$ while the valve operating internal-resistance control based on the requested quantity of increase or decrease in the internal resistance of the engine 10 is being performed, the ECU shifts to the normal valve operating output control based on the engine speed $N_E$ and the fuel injection quantity. However, as long as there is no possibility that the engine 10 will be stalled, the fuel injection is not restarted until the switching to the selected mode is completed, to allow an increase in emission to be prevented.

In addition to the variable valve operating system 27 for the exhaust valve 14 described above, the variable valve operating system 27 configured to open and close the intake valve 13 is effectively switched to the optimum mode based on the requested quantity of increase or decrease. Furthermore, in the variable valve operating system according to the present embodiment, the three rocker arms 28a to 28c are provided for the one exhaust valve 14. However, the present invention may be adapted to the two rocker arms 28a and 28b provided for the one exhaust valve 14. In this case, the valve operating internal-resistance control may be performed differently for a large requested quantity of increase or decrease in internal resistance and for a small requested quantity of increase or decrease in internal resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An operation control apparatus for an internal combustion engine in which a variable valve control system is assembled, the variable valve control system including:
    a first rocker arm with which an intake valve or an exhaust valve is contact and which rocks in conjunction with rotation of a first cam;
    a second rocker arm with which the intake valve or the exhaust valve is not contact and which rocks in conjunction with rotation of a second cam with a cam profile different from a cam profile of the first cam;
    a first lost motion spring configured to bias and bring the second rocker arm into contact with the second cam; and
    switching means for switching the first rocker arm and the second rocker arm to a coupled state or an uncoupled state based on a fuel injection quantity supplied to the internal combustion engine and a rotational speed of the internal combustion engine, the operation control apparatus comprising:
    means for determining whether or not a rotational speed of the internal combustion engine is equal to or higher than a preset first rotational speed at which supply of fuel to the internal combustion engine is allowed to be temporarily stopped;
    an accelerator position sensor; and
    means for setting a requested quantity of increase or decrease in internal resistance of the internal combustion engine according to a situation of a vehicle,
    wherein when the rotational speed of the internal combustion engine is equal to or higher than the first rotational speed and an output value of the accelerator position sensor is 0%, the switching means switches the first rocker arm and the second rocker arm to the coupled state or the uncoupled state based on the set requested quantity of increase or decrease in internal resistance.

2. The operation control apparatus for an internal combustion engine as claimed in claim 1, wherein the switching means switches the first rocker arm and the second rocker arm to the uncoupled state when the requested quantity of increase or decrease in internal resistance is equal to or smaller than a first predetermined value, and switches the first rocker arm and the second rocker arm to the coupled state when the requested quantity of increase or decrease in internal resistance is larger than the first predetermined value.

3. The operation control apparatus for an internal combustion engine as claimed in claim 2, wherein when the rotational speed of the internal combustion engine becomes lower than the first rotational speed with the output value of the accelerator position sensor remaining at 0% in the state of the first rocker arm and the second rocker arm switched by the switching means to the coupled state or the uncoupled state based on the set requested quantity of increase or decrease in internal resistance, the switching means switches the first rocker arm and the second rocker arm to the coupled state or the uncoupled state based on the rotational speed of the internal combustion engine.

4. The operation control apparatus for an internal combustion engine as claimed in claim 3, wherein variable valve control system further includes a second lost motion spring configured to bias and bring the third rocker arm into contact with the third cam.

5. The operation control apparatus for an internal combustion engine as claimed in claim 4, wherein the first and second lost motion springs exert different spring forces, and the switching means switches all of the first and second and third rocker arms to the uncoupled state when the requested quantity of increase or decrease in internal resistance is equal to or smaller than a first predetermined value, switches the first rocker arm and the rocker arm to which the spring force of the lost motion spring with the higher spring force is applied, to the coupled state, when the requested quantity of increase or decrease in internal resistance is equal to or larger than a second predetermined value larger than the first predetermined value, and switches the first rocker arm and the rocker arm to which the spring force of the lost motion spring with the lower spring force is applied, to the coupled state, when the requested quantity of increase or decrease in internal resistance is larger than the first predetermined value and smaller than the second predetermined value.

6. The operation control apparatus for an internal combustion engine as claimed in claim 3, wherein, when the rotational speed of the internal combustion engine is lower than a preset second rotational speed lower than the first rotational speed, supply of fuel to the internal combustion engine is restarted regardless of whether or not the switching means is actuated.

7. The operation control apparatus for an internal combustion engine as claimed in claim 1, wherein when the rotational speed of the internal combustion engine becomes lower than the first rotational speed with the output value of the accelerator position sensor remaining at 0% in the state of the first rocker arm and the second rocker arm switched by the switching means to the coupled state or the uncoupled state based on the set requested quantity of increase or decrease in internal resistance, the switching means switches the first rocker arm and the second rocker arm to the coupled state or the uncoupled state based on the rotational speed of the internal combustion engine.

8. The operation control apparatus for an internal combustion engine as claimed in claim 7, wherein, when the rotational speed of the internal combustion engine is lower than a preset second rotational speed lower than the first rotational speed, supply of fuel to the internal combustion engine is restarted regardless of whether or not the switching means is actuated.

9. The operation control apparatus for an internal combustion engine as claimed in claim 1, wherein the variable valve control system further includes a third rocker arm configured to rock in conjunction with rotation of a third cam with which a second intake valve or exhaust valve is contact and which has a cam profile different from the cam profiles of the first and second cams, and wherein the switching means selectively switches the first and second and third rocker arms to the coupled state or the uncoupled state based on the fuel injection quantity supplied to the internal combustion engine and the rotational speed of the internal combustion engine.

10. The operation control apparatus for an internal combustion engine as claimed in claim 9, wherein when the rotational speed of the internal combustion engine becomes lower than the first rotational speed with the output value of the accelerator position sensor remaining at 0% in the state of the first and second and third rocker arms selectively switched by the switching means to the coupled state or the uncoupled state based on the set requested quantity of increase or decrease in internal resistance, the switching means selectively switches the first and second and third rocker arms to the coupled state or the uncoupled state based on the rotational speed of the internal combustion engine.

11. The operation control apparatus for an internal combustion engine as claimed in claim 10, wherein, when the rotational speed of the internal combustion engine is lower than a preset second rotational speed lower than the first rotational speed, supply of fuel to the internal combustion engine is restarted regardless of whether or not the switching means is actuated.

12. The operation control apparatus for an internal combustion engine as claimed in claim 1, which is used in a vehicle equipped with the internal combustion engine and a battery charged using the internal combustion engine and wherein the means for setting the requested quantity of increase or decrease in internal resistance includes means for acquiring a charge state of the battery.

13. The operation control apparatus for an internal combustion engine as claimed in claim 1, wherein the means for setting the requested quantity of increase or decrease in internal resistance includes means for acquiring a deceleration of the vehicle.

14. The operation control apparatus for an internal combustion engine as claimed in claim 1, wherein the means for setting the requested quantity of increase or decrease in internal resistance includes means for acquiring a vehicle speed.

\* \* \* \* \*